United States Patent
Tsumiyama et al.

(10) Patent No.: US 6,647,823 B2
(45) Date of Patent: Nov. 18, 2003

(54) BICYCLE CONTROL DEVICE

(75) Inventors: Akira Tsumiyama, Osaka (JP); Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/995,060

(22) Filed: Nov. 26, 2001

(65) Prior Publication Data

US 2002/0139637 A1 Oct. 3, 2002

Related U.S. Application Data

(63) Continuation-in-part of application No. 09/823,287, filed on Mar. 30, 2001.

(51) Int. Cl.⁷ .................................................. F16C 1/12
(52) U.S. Cl. .......................... 74/501.6; 74/502.2; 74/489
(58) Field of Search ......................... 74/473.13, 473.14, 74/473.15, 488, 489, 501.6, 502.2, 500.5, 473.3, 473.33

(56) References Cited

U.S. PATENT DOCUMENTS

| | | | |
|---|---|---|---|
| 598,762 A | 2/1898 | Behrens | 475/215 |
| 648,059 A | 4/1900 | Sutch | 74/485 |
| 1,185,546 A | 5/1916 | Rodgers | 74/286 |

(List continued on next page.)

FOREIGN PATENT DOCUMENTS

| | | | | |
|---|---|---|---|---|
| FR | 1007339 | 2/1952 | | 74/502.2 |
| GB | 134931 | 11/1919 | | 74/502.2 |
| GB | 2135028 | 8/1984 | | 74/502.2 |
| IT | 561377 | 4/1957 | | 74/502.2 |
| IT | 567858 | 10/1957 | | 74/502.2 |
| JP | 04331689 A | * 11/1992 | | B62L/3/02 |
| JP | 2002154468 A | * 5/2002 | | B62K/15/00 |

*Primary Examiner*—David Fenstermacher
(74) *Attorney, Agent, or Firm*—Jeffer, Mangels, Butler & Marmaro LLP

(57) ABSTRACT

A bicycle control device is disclosed having a control lever that is operable in a first direction to operate the brake control mechanism, a second direction to operate the shift control mechanism in the pulling direction and a third direction to operate the shift control mechanism in the release direction. In a preferred embodiment of the invention, when viewed from the perspective of a rider on the bicycle, the first direction is the direction of movement of the lever toward the handlebar. The second direction is the direction of movement of the control lever downward and the third direction is the direction of movement of the control lever upward. In a more preferred embodiment, the second and third directions are perpendicular to the first direction.

34 Claims, 14 Drawing Sheets

U.S. PATENT DOCUMENTS

| | | | |
|---|---|---|---|
| 1,666,793 A | 4/1928 | Sanguineti | 74/489 |
| 1,709,346 A | 4/1929 | Garrard | 475/215 |
| 2,336,682 A | 12/1943 | Grosse et al. | 74/489 |
| 2,422,343 A | 6/1947 | Duer | 74/282 |
| 2,490,783 A | 12/1949 | Cullen | 475/280 |
| 2,745,297 A | 5/1956 | Andrus | 74/689 |
| 2,789,648 A | 4/1957 | Huffman | 180/66 |
| 2,796,773 A | 6/1957 | Wooler et al. | 74/489 |
| 2,931,250 A | 4/1960 | Ebert | 74/687 |
| 3,298,174 A | 1/1967 | Stoyke et al. | 60/19 |
| 3,478,617 A | 11/1969 | Maeda | 74/489 |
| 3,534,629 A | 10/1970 | Schwerdhofer | 192/4 |
| 3,554,158 A | 1/1971 | Shimano et al. | 74/489 |
| 3,567,250 A | 3/1971 | Wolf | 280/289 |
| 3,595,351 A | 7/1971 | Ishida | 74/489 |
| 3,605,522 A | 9/1971 | Grosseau | 74/689 |
| 3,808,907 A | 5/1974 | Yamaguchi | 74/471 |
| 3,934,492 A | 1/1976 | Timbs | 74/740 |
| 4,002,350 A | 1/1977 | Timbs | 192/4 |
| 4,100,820 A | 7/1978 | Evett | 192/4 |
| 4,132,296 A | 1/1979 | Evett | 74/489 |
| 4,319,673 A | 3/1982 | Kojima | 192/4 |
| 5,241,878 A | 9/1993 | Nagano | 74/502.2 |
| 5,251,878 A | 10/1993 | Mann et al. | 254/344 |
| 5,257,683 A * | 11/1993 | Romano | 192/217 |
| 5,287,766 A | 2/1994 | Nagano | 74/502.2 |
| 5,479,776 A * | 1/1996 | Romano | 74/502.2 |
| 5,775,168 A | 7/1998 | Furuta | 74/489 |
| 5,806,372 A * | 9/1998 | Campagnolo | 74/473.14 |
| 5,881,602 A * | 3/1999 | Cirami | 74/473.14 |
| 6,095,309 A * | 8/2000 | Mione | 192/217 |
| 6,142,281 A * | 11/2000 | Campagnolo | 192/217 |
| 6,216,078 B1 | 4/2001 | Jinbo et al. | 701/70 |

\* cited by examiner

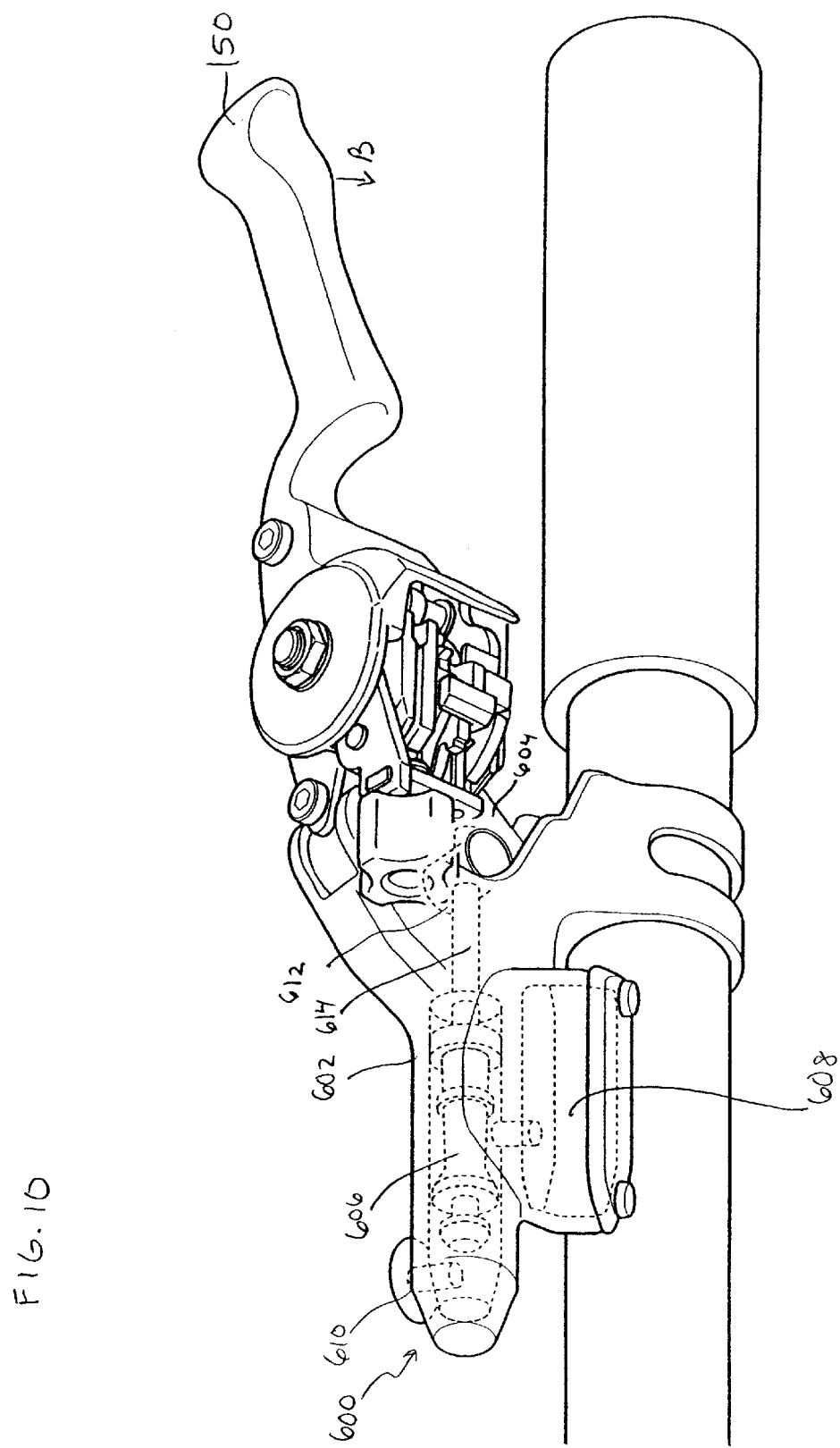

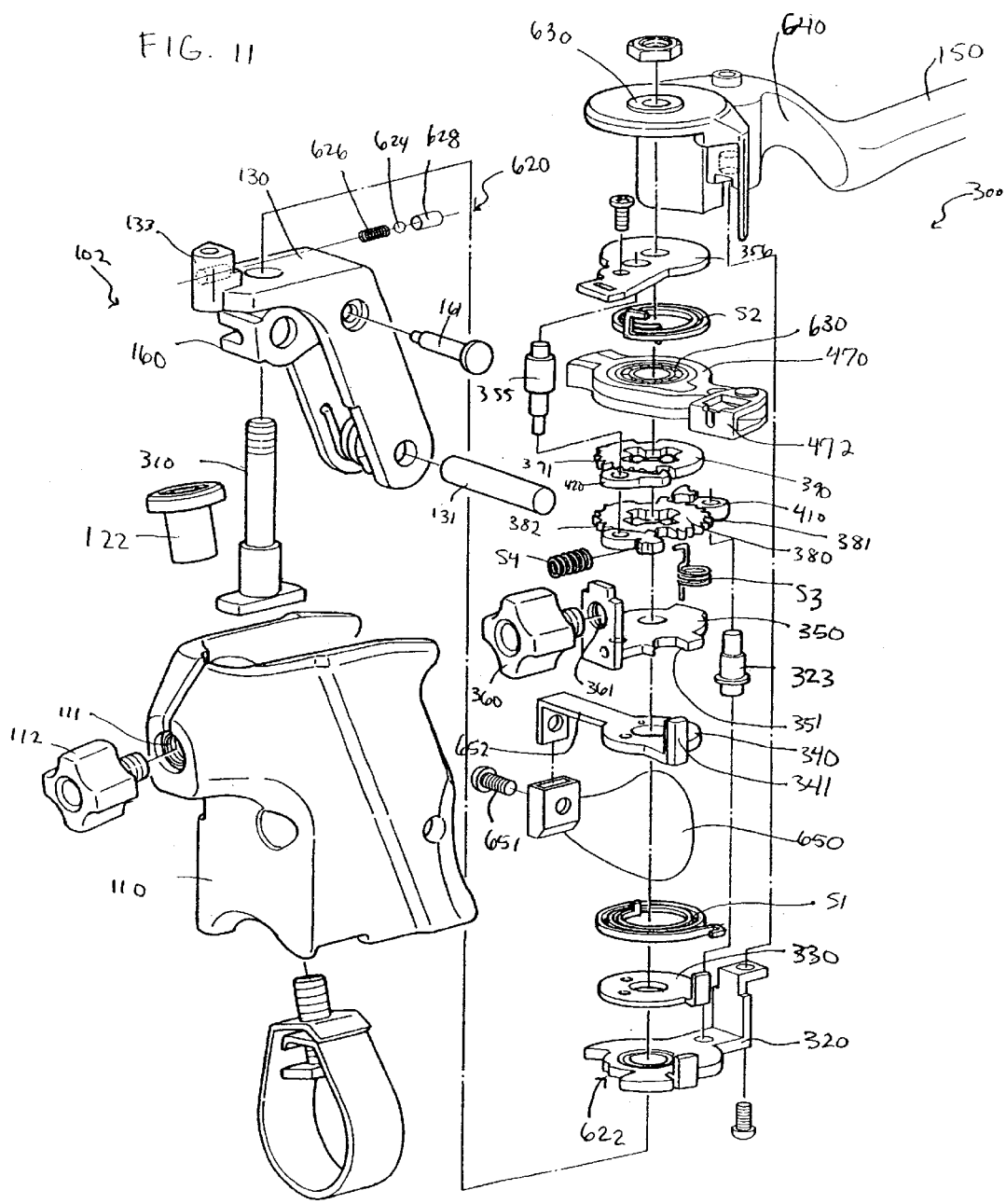

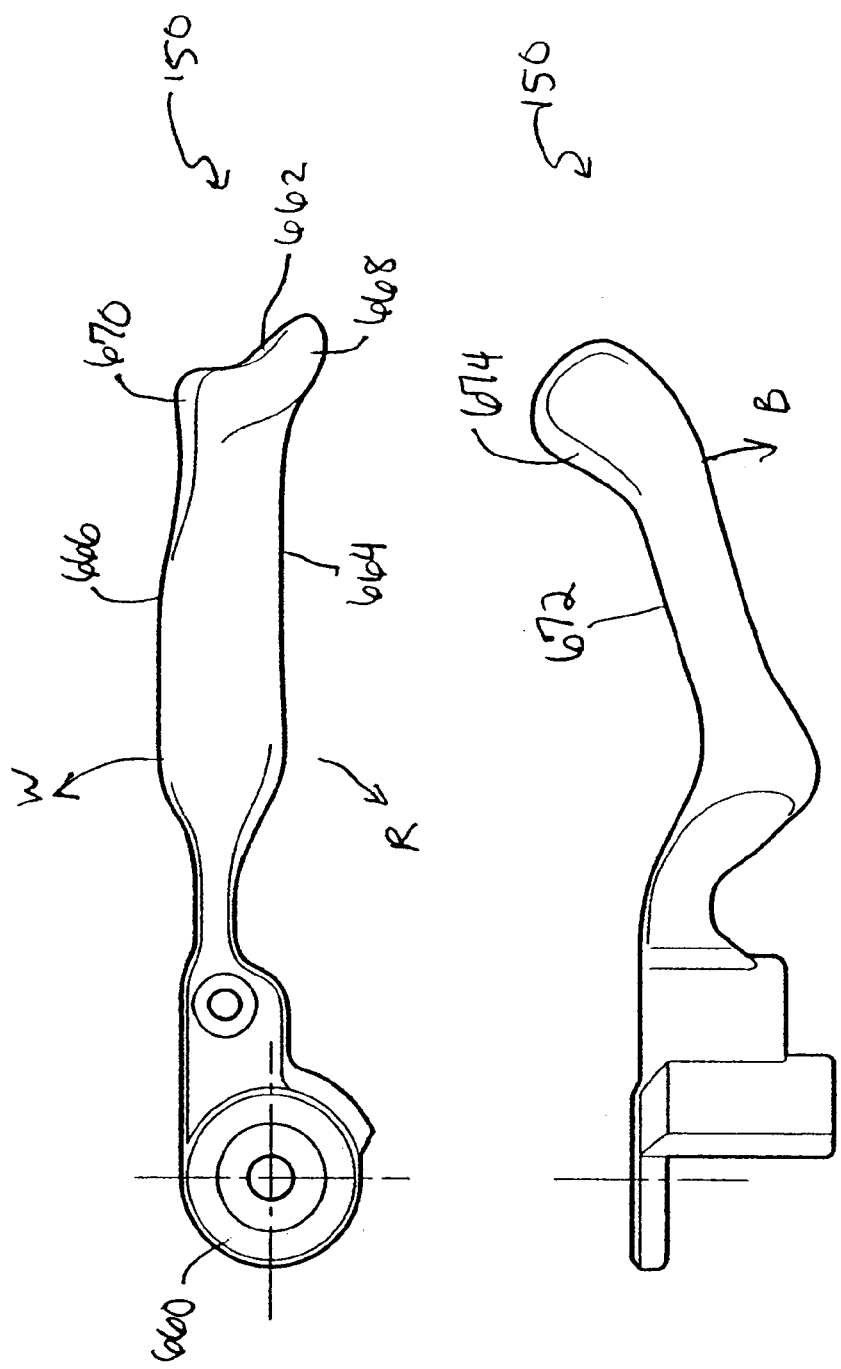

BICYCLE CONTROL DEVICE

CROSS-REFERENCE TO RELATED APPLICATION

This application is a continuation-in-part of pending U.S. application Ser. No. 09/823,287 filed Mar. 30, 2001.

FIELD OF THE INVENTION

The present invention relates generally to a bicycle control device mountable on the handlebar of a bicycle for operating cable actuated bicycle components. More particularly, the invention relates to a bicycle control device having a control lever that operates both the brake mechanism and the gear shifting mechanism.

BACKGROUND OF THE INVENTION

Generally, when riding a bicycle, it is desirable to be able to operate the brake control mechanism and the shift control mechanism of the bicycle quickly and easily. Known bicycle devices have made it easier for riders to shift and brake while maintaining control of the handlebar by providing a single lever for operation of the shifting mechanism. However, the known devices still require the removal of the rider's thumb from the handlebar for shifting. To prepare for an unexpected need for braking, experienced riders prefer to keep an index finger and/or a middle finger on the brake lever at all times, especially in rugged conditions such as off-road riding. When the fingers are on the brake lever, it is important to maintain one's thumb on the handlebar to have better control of the bicycle. By requiring the removal of the rider's thumb from the handlebar for shifting, the known control devices reduce the rider's control of the bicycle during shifting.

Some devices have attempted to alleviate this problem by providing a shift control device that is operable in the winding direction using the rider's brake-operating fingers. The problem with the known devices is that the rider is still required to remove his fingers from the brake lever to operate the shift control mechanism in a release direction. Additionally, the known devices are designed for use with drop-bar type handlebars and cannot be used with flat-bar type handlebars.

Accordingly, it is desirable to provide a bicycle control device that enables the rider to operate the brake control mechanism and shift control mechanism of a bicycle without requiring the removal of the rider's fingers from the handlebar or from the brake control lever.

It is also desirable to provide a shift control device that can be operated while the rider is gripping handlebar extensions.

SUMMARY OF THE PREFERRED EMBODIMENTS

A bicycle control device is disclosed having a control lever that is operable in a first direction to operate the brake control mechanism, a second direction to operate the shift control mechanism in the winding direction and a third direction to operate the shift control mechanism in the release direction. In a preferred embodiment of the invention, when viewed from the perspective of a rider on the bicycle, the first direction is the direction of movement of the lever toward the handlebar. The second direction is the direction of movement of the control lever downward and the third direction is the direction of movement of the control lever upward. In a more preferred embodiment, the second and third directions are perpendicular to the first direction.

The brake control mechanism preferably includes a brake lever base pivotably connected on the bracket wherein the operation of the control lever in the first direction pivots the brake lever base on the bracket and pulls a brake cable attached to a cable hook on the brake lever base.

The shift control mechanism preferably includes a support shaft fixedly connected to the brake lever base of the brake control mechanism. A winding member is rotatable in the winding direction and in the release direction about the support shaft to wind and release a shifting cable thereon. A winding mechanism is provided having a winding pawl engageable with a winding latch to rotate the winding member in a winding direction. The winding member is preferably biased in the release direction. To limit the rotation of the winding member in the release direction, the bicycle control device includes a release and hold mechanism. The release and hold mechanism preferably includes a first latching plate having a releasing latch and a second latching plate having an interrupting latch wherein the release pawl engages with the releasing latch and an interrupting pawl engages with the interrupting latch alternately to limit the rotation of the winding member in the release direction.

The bicycle control device of the present invention is preferably configured to be used with a flat-bar type handlebar. In another embodiment of the invention, the bicycle control device can be used with a flat-bar type handlebar having handlebar extensions extending upward from the handlebar. In this embodiment, the rider is able to operate the control lever in a winding and release direction while gripping the handlebar extensions.

In another embodiment of the invention, the bicycle control device includes a release lever that is configured to be operable by a rider's thumb when the rider is gripping the handlebar.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 10 is a perspective view of another preferred embodiment of the bicycle control device of the present invention connected to a hydraulic brake mechanism, shown in phantom;

FIG. 11 is an exploded perspective view of another preferred embodiment of the bicycle control device of the present invention;

FIG. 12 is a plan view of a preferred embodiment of the control lever of the present invention having risings; and FIG. 13 is a side view of the control lever shown in FIG. 12.

Like numerals refer to like parts throughout the several views of the drawings.

DETAILED DESCRIPTION OF THE PREFERRED EMBODIMENTS

Figure 1:
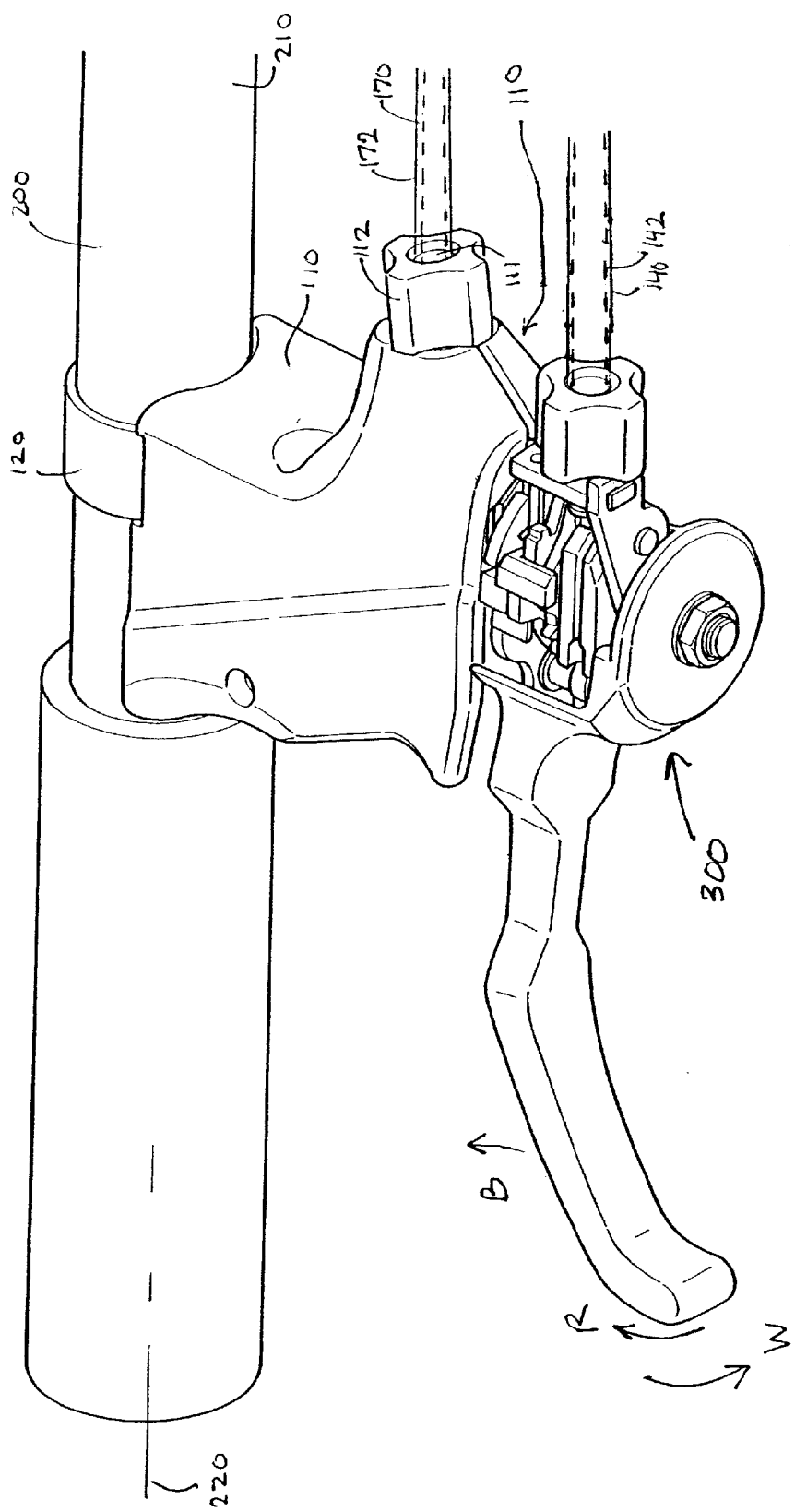
FIG. 1 is a perspective view of a preferred embodiment of the bicycle control device of the present invention as attached to a bicycle handlebar.
Figure 2:
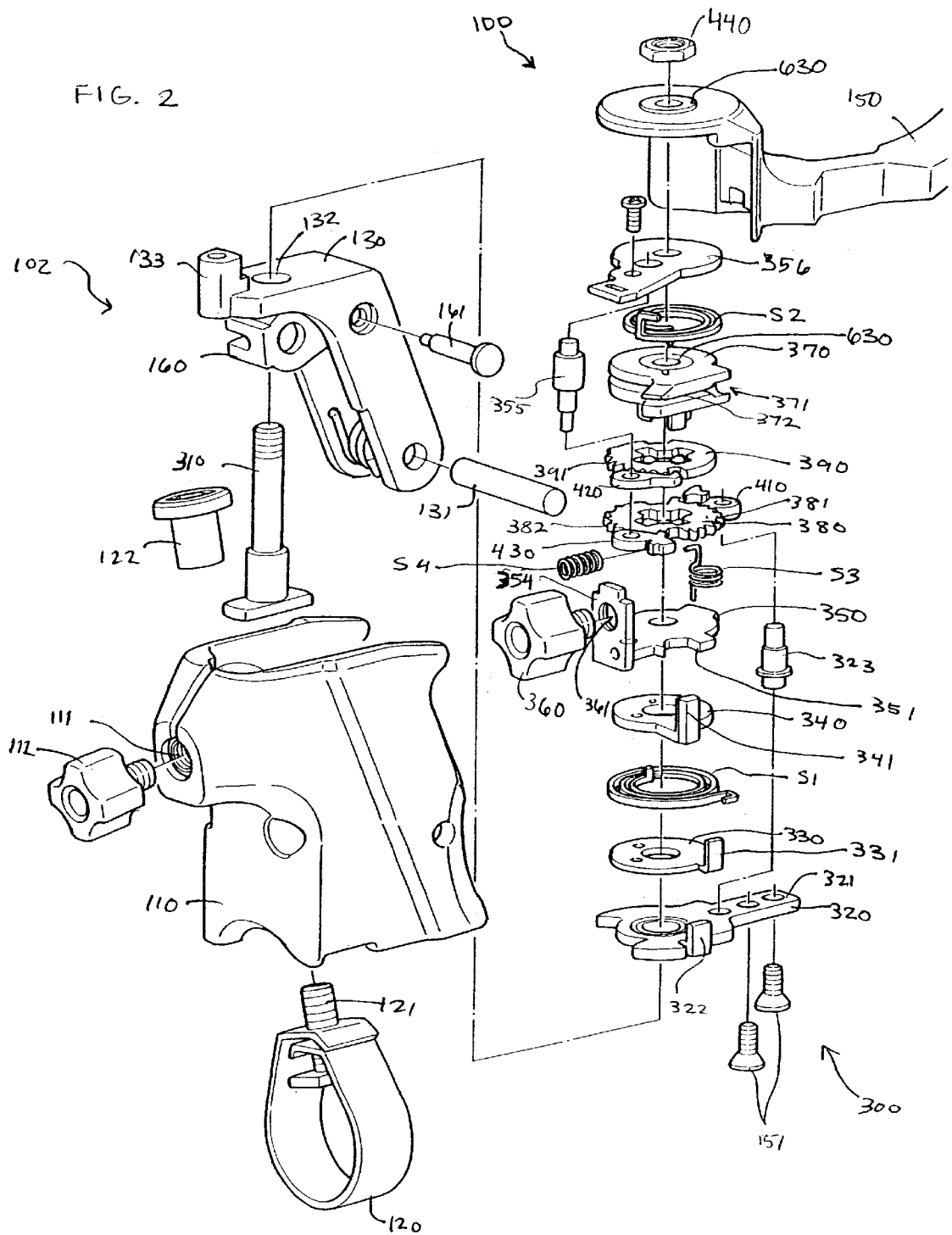
FIG. 2 is an exploded perspective view of a preferred embodiment of the bicycle control device of the present invention.

As shown in FIGS. 1 and 2, the bicycle control device 100 of the present invention is attachable to the handlebar 200 of a bicycle by a bracket 110. In a preferred embodiment of the invention, the handlebar 200 is a flat-bar type handlebar having a cylindrical body 210 that extends substantially along a handlebar axis 220. The bicycle control device 100 is secured to the handlebar 200 of a bicycle preferably by a clamp band 120, a bolt 121 and a nut 122, as best shown in FIG. 2.

The bicycle control device 100 includes a control lever 150 that, as will be described in further detail below, operates cable actuated bicycle components such as the brake control mechanism 102 and the shift control mechanism 300. In a preferred embodiment of the invention, the control lever 150 is configured such that operation of the control lever 150 in a first direction, B, operates the brake control mechanism, in a second direction, W, operates the shift control mechanism in a winding direction, and in a third direction, R, operates the shift control mechanism in a release direction. In a more preferred embodiment, as shown in FIG. 1, when viewed from the position of the rider on the bicycle, the first direction, B, is the direction of movement of the control lever 150 from a neutral position toward the handlebar 200 of the bicycle; the second direction, W, is the direction of movement of the control lever 150 from a neutral position downward; and the third direction, R, is the direction of movement of the control lever 150 from a neutral position upward.

As shown in FIGS. 1 and 2, the brake control mechanism 102 of the bicycle control device 100 preferably includes a brake cable receiving bore 111 and a brake cable adjuster 112. The brake cable receiving bore 111 receives the outer casing 172 of the brake cable 170 and the brake cable 170 is threaded into the bracket 110. The brake cable adjuster 112 controls the brake cable tension and can be adjusted to a desired tension level.

As best shown in FIG. 2, a brake lever base 130 is pivotally connected to the bracket 110 by a pivot pin 131. To actuate the brake cable 170, a cable hook 160 is pivotably connected to the brake lever base 130 by pivot pin 161. The cable hook 160 is configured to receive the end of the brake cable 170 such that a movement of the cable hook 160 corresponds to a movement in the brake cable 170.

In another preferred embodiment of the present invention, as shown in FIG. 10, the control lever 150 operates a hydraulically actuated brake mechanism 600. As with the cable actuated brake mechanism, the control lever 150 is configured such that operation of the control lever 150 in a first direction, B, operates the hydraulic brake mechanism 600. The hydraulic brake mechanism 600 preferably includes a hydraulic brake bracket 602 pivotally fixed with brake lever base 604. A piston 606 is housed within the brake bracket 602 and controls communication between a fluid reservoir 608 and an outlet 610 that connects to a brake line (not shown). A nipple 612 and pin 614 are fixedly attached and are movable relative to the brake lever base 604. When the control lever 150 is moved in the first direction B, the base 604 moves with the lever, causing the nipple 612 to rotate. The rotation of the nipple 612 causes the pin 614 to push the piston 606. The piston 606, in turn, pushes the brake fluid toward the outlet 610.

In reference to FIG. 2, according to a preferred embodiment of the invention, the shift control mechanism 300 includes a pivot shaft 310 and a winding member 370 rotatably supported on the pivot shaft 310. The winding member 370 includes a shift cable attachment portion 371 and a winding groove 372. The shift cable attachment portion 371 securely receives an end of the shift cable 140 and the winding groove 372 receives the shift cable 140 as it is wound on the winding member 370.

The rotation of the winding member 370 operates to wind or release a shift cable thereon to control a gear change mechanism, such as a derailleur, in a manner known by those skilled in the art. The winding member 370 rotates about the pivot shaft 310, which is preferably fixedly attached to the top plane 132 of the brake lever base 130. In a more preferred embodiment of the invention, the pivot shaft 310 is press fitted perpendicular to the top plane 132 of the brake lever base 130.

In a preferred embodiment of the invention, the shift control mechanism 300 includes an operating plate 320, a winding plate 330, a releasing plate 340 and a fixed plate 350. The operating plate 320 is rotatably supported on the pivot shaft 310 and includes a brake lever mounting portion 321 and an operating abutment 322. The brake lever mounting portion 321 of the operating plate 320 is preferably fixedly connected to the control lever 150 via fasteners 151 such that the control lever 150 and operating plate 320 rotate together about the pivot shaft 310 when the control lever 150 is operated. The use of fasteners 151 to fix the control lever 150 to the operating plate 320 reduces the replacement costs in the event of damage to the control lever 150. If the bicycle falls hard, the control lever 150 absorbs the shock and, possibly suffers damage. In the preferred embodiment, because the control lever is separable from the operating plate 320, the control lever 150 can be removed and a new control lever installed. This eliminates the need for replacing the entire gear shift mechanism.

In another preferred embodiment of the invention, as shown in FIG. 11, the control lever 150 includes a narrow portion 640. The operating plate 320 is preferably fastened to the control lever 150 at the narrow portion 640. The control lever 150 is removably fastened to the narrow portion 640 and can be unfastened and replaced with a new control lever.

Referring to FIG. 2, the winding plate 330 and releasing plate 340 are each rotatably supported on the pivot shaft 310. The winding plate 330 includes a winding abutment 331 and the releasing plate 340 includes a releasing abutment 341 extending therefrom. The fixed plate 350 is fixedly supported on the pivot shaft 310. In a preferred embodiment of the invention, the fixed plate 350 is fixedly connected to a mounting member 133 of the brake lever base 130. The fixed plate 350 includes a fixed abutment 351 and a cable stop 354. The cable stop 354 is configured to receive an end of the shift cable 140 (shown in FIG. 1). As best shown in FIG. 1, the outer casing 142 of the shift cable 140 is received by the shift cable adjuster 360 and the shift cable 140 is threaded through the shift cable receiving bore 361 of the shift cable adjuster 360 to the cable stop 354. The shift cable adjuster 360 is threadingly engaged with the cable stop 354 for adjusting the tension of the shift cable 140. The shift cable 140 is preferably substantially parallel to the control lever 150 at the point where the cable 140 is received by the shift control mechanism 300.

In a preferred embodiment of the invention, the winding abutment 331 of the winding plate 330 and the release abutment 341 of the release plate 340 are biased toward the fixed abutment 351 of the fixed plate 350 by a first spring S1. In a neutral position, the winding abutment 331 abuts a first side 352 of the fixed abutment 351 and the releasing abutment 341 abuts a second side 353 of the fixed abutment 351. The operating abutment 322 is preferably positioned between the winding abutment 331 and the releasing abutment 341. As will be described in further detail below, the operating abutment 322 moves the winding abutment 331 in the winding direction, W, when the control lever 150 is rotated in the winding direction and moves the releasing abutment 341 in the release direction, R, when the control lever 150 is rotated in the release direction.

The winding member 370 is preferably biased in the release direction, R, by second spring, S2. To facilitate the rotation of the winding member 370, a first latch plate 380 and a second latch plate 390 are fixedly coupled to winding member 370 such that the winding member 370, the first latch plate 380 and the second latch plate 390 rotate about the pivot shaft 310 simultaneously, as a unitary body. To operate the winding member 370 in a winding direction, a winding mechanism 104 is provided including a winding latch 381 defined peripherally of the first latch plate 380 having a plurality of teeth 383, a winding pawl 410 for engaging the teeth 383 of the winding latch 381, and a third spring S3 for urging the winding pawl 410 toward an engaging position. The winding pawl 410 is preferably rotatably supported on a pivot shaft 323 fixed on the operating plate 320.

To operate the winding member 370 in a release direction, a hold and release mechanism 106 is provided including an interrupting latch 391 defined peripherally on the second latch plate 390 having a plurality of teeth 392 and an interrupting pawl 420 for engaging the teeth 392 of the interrupting latch 390. The interrupting pawl 420 is preferably freely rotatably supported on a pivot shaft 355 that is fixedly connected to an upper plate 356. The hold and release mechanism 106 further includes a positioning latch 382 having a plurality of teeth 384 defined peripherally on the first latch plate 380, a positioning pawl 430 for engaging the teeth 384 of the positioning latch 382, and a fourth spring S4 for urging the positioning pawl 430 toward an engaging position. The positioning pawl 430 is preferably rotatably supported on the pivot shaft 355. The positioning latch 382 is preferably spaced apart from the winding latch 381.

The upper plate 356 is fixedly supported on the cable stop 354, the pivot shaft 355 and the main pivot shaft 310. To securely retain the parts installed on the main pivot shaft 310, a nut 440 is threaded onto the main pivot shaft 310. To minimize friction and ensure smooth operation of the control lever 150 and the winding member 370, bearings 630 are provided in the shift control mechanism. In a preferred embodiment of the invention, the bearings 630 are ball bearings. In another embodiment of the invention, solid bearings can be used. The bearings 630 of the present invention are not limited to those described herein but may include any bearing that facilitates the smooth operation of the control lever 150 and the winding member 370.

In another preferred embodiment of the invention, as shown in FIG. 11, the winding member 370 is replaced with a cable pulling member 470. The cable pulling member 470 operates to pull and release the shift control cable without winding the cable thereon. In a preferred embodiment of the invention, the cable pulling member 470 includes a cable hook 472 for securely receiving the shift cable 142 (shown in FIG. 1). In a more preferred embodiment of the invention, the shift cable 142 is substantially parallel to control lever 150 at the point where the cable is received by the shift control mechanism 300.

Figure 3:
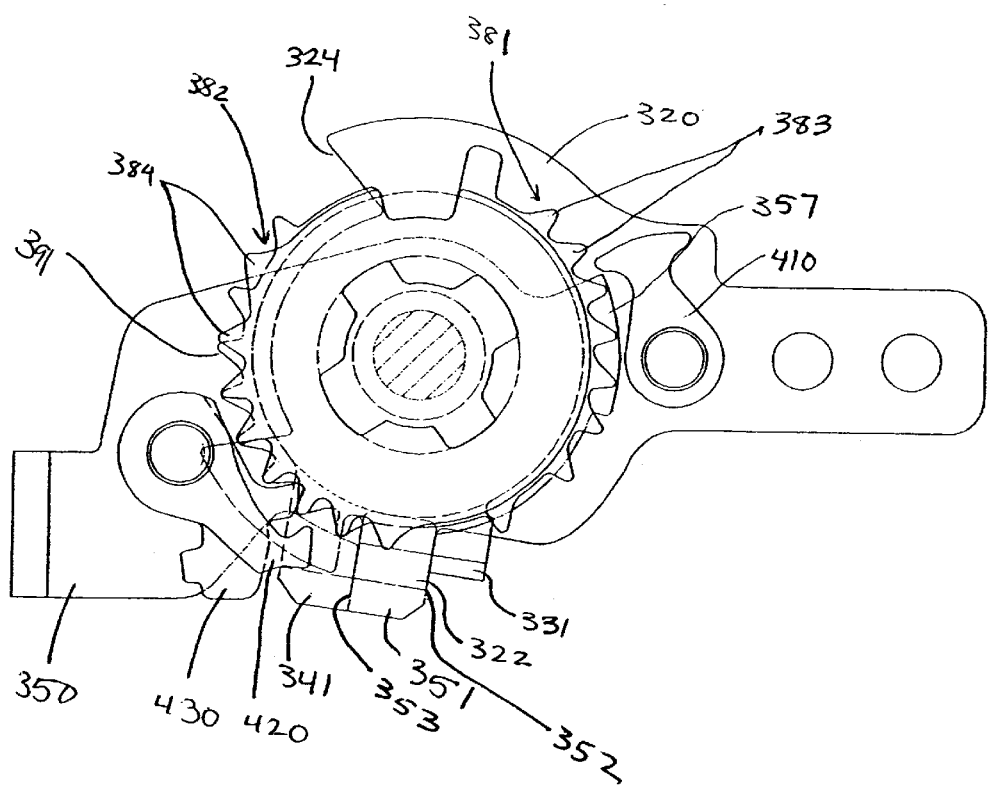
FIG. 3 is a top cross-sectional view of the shift control mechanism of the present invention in a neutral position.

FIG. 3 depicts the shift control mechanism 300 of the present invention in a neutral position. In the neutral state, the operating plate 320 remains stationary. The winding abutment 331 abuts the first side 352 of the fixed abutment 351 and the releasing abutment 341 abuts the second side 353 of the fixed abutment 351. In a neutral state, the operating abutment 322 is positioned between the winding abutment 331 and the releasing abutment 341. The winding abutment 331 and the releasing abutment 341 are preferably biased toward the fixed abutment 351, effectively squeezing the operating abutment 322 and the fixed abutment 351 therebetween.

In the neutral position, the winding pawl 410 preferably rests on a cam 357 formed peripherally on the fixed plate 350. The interrupting pawl 420 is positioned between the interrupting latch 391 and an inside edge 342 of the releasing abutment 341. Because the interrupting pawl 420 is not biased toward the interrupting latch 391, in the neutral state, the interrupting pawl 420 does not engage the teeth 392 of the interrupting latch 391.

In the neutral state, the winding member 370 is biased in the release direction (clockwise in FIG. 3) by second spring S2 and by the spring tension of the gear change mechanism (not shown) that is transmitted via the shift cable 140 (shown in FIG. 1). To maintain the position of the winding member 370, the positioning pawl 430 engages the positioning latch 382 thereby holding the winding member 370, the first latch plate 380 and second latch plate 390 in a stationary position.

In a more preferred embodiment of the invention, as shown in FIG. 11, to prevent against unwanted movement of the operating plate 320 caused by vibrations, the operating plate 320 is held in a neutral position using a detent assembly 620. The detent assembly 620 preferably includes a slot 622 defined in the operating plate 320, configured to engage a ball 624 when the operating plate is in the neutral position. The ball 624 is preferably biased toward the slot 622 by a spring 626. As best shown in FIG. 13, in a preferred embodiment of the invention, the spring 626, ball 624, and cover 628 are inserted in the mounting member 133 of the brake lever base 130. By maintaining the operating plate 320 in a neutral position, the detent assembly 620 prevents unintentional shifting of the shift control mechanism.

FIGS. 4a through 4e depict the operation of the shift control mechanism 300 in a winding direction. To actuate the shift control mechanism 300 in a winding direction W, the control lever 150 is activated in a winding direction. As discussed above, in a preferred embodiment of the invention, as viewed from the rider's perspective, the winding direction W is defined as the direction of movement of the control lever 150 from the neutral position downward. In a more preferred embodiment of the invention, the winding direction W is perpendicular to the braking direction B. In FIGS. 4a through 4e, the elements that do not relate to the winding operation are eliminated for ease of understanding.

Figure 4A:
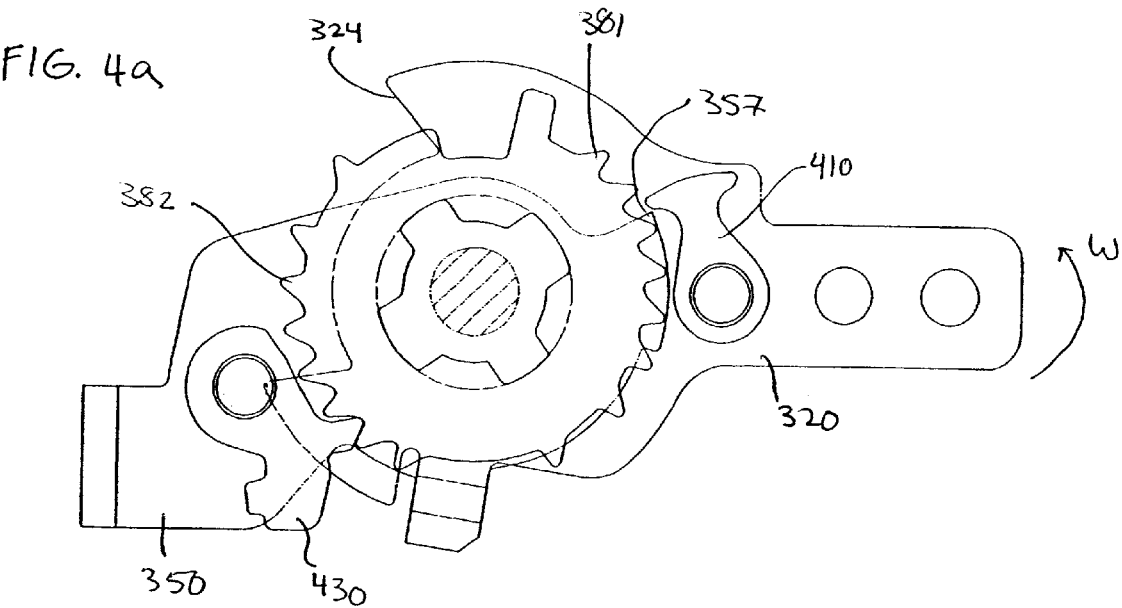
FIGS. 4a–4e are top cross-sectional views of the shift control mechanism of the present invention in operation in a winding direction.
Figure 4B:
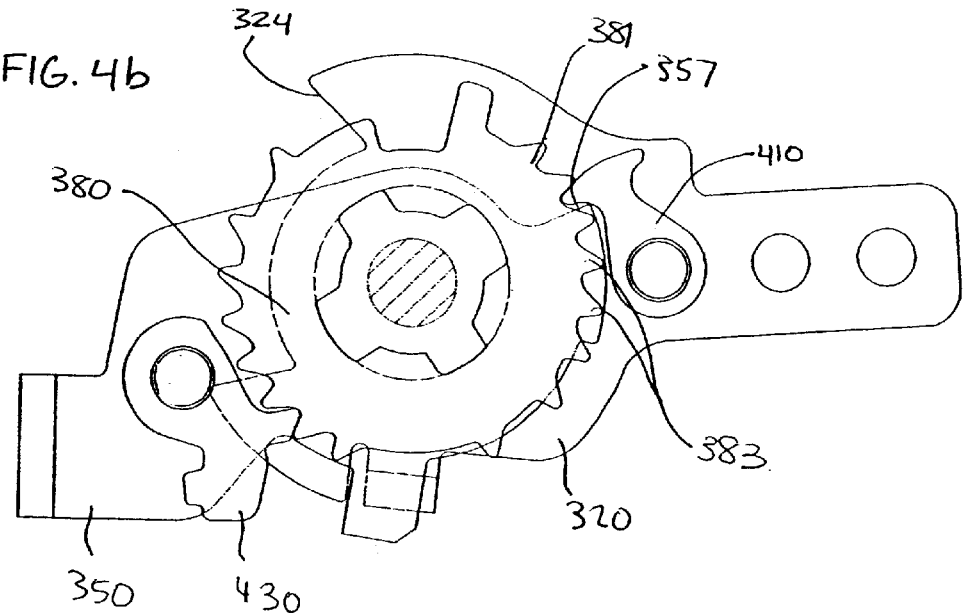

FIG. 4a depicts the shift control mechanism 300 of the present invention in a neutral position. Because the operating plate 320 is fixedly attached to the control lever 150, as the control lever 150 is operated in the winding direction, the operating plate also operates in the winding direction. As best shown in FIG. 4b, the rotation of the operating plate 320, causes the winding pawl 410 to slide off of the fixed plate cam 357. Because the winding pawl 410 is biased toward the winding latch 381, the winding pawl 410 engages one of the teeth 383 of the winding latch 381. When the winding pawl has engaged one of the teeth 383 of the winding latch, rotation of the operating plate 320 translates to a rotation of the first latch plate 380.

Figure 4C:
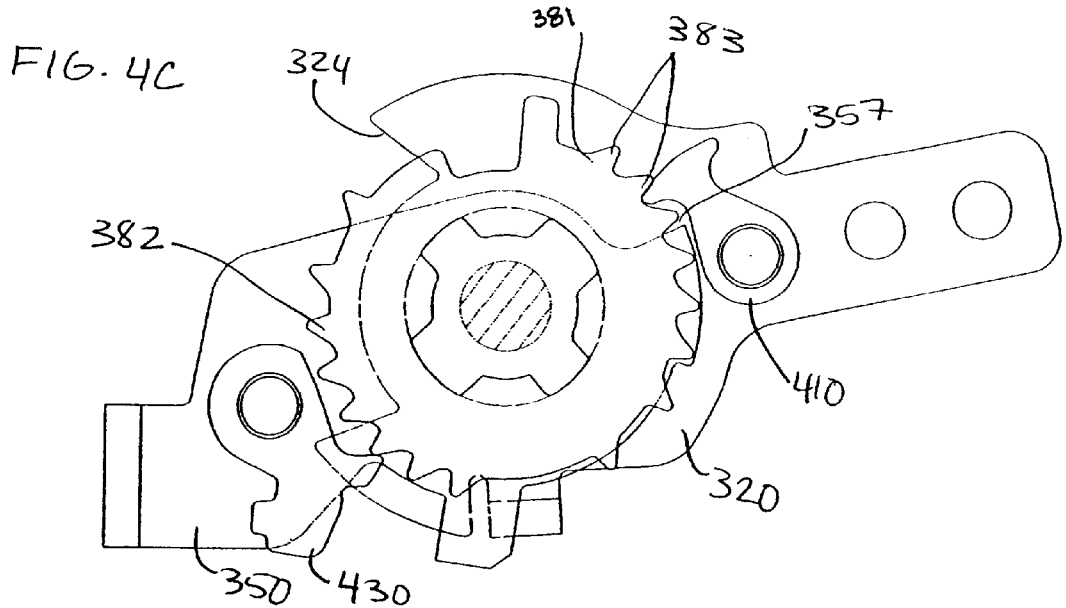

As best shown in FIG. 4c, the rotation of the first latch plate 380 driven by winding pawl 410 causes the positioning pawl 430 to disengage from the teeth 384 of the positioning latch 382. As the first latch plate 380 is further rotated, the positioning pawl 430 moves toward a tooth of the positioning latch 382 adjacent the previously engaged tooth. Because the first latch plate 380 is fixedly connected to the winding member 370, the winding member 370 rotates simultaneously with the first latch plate 380 in the winding direction W, thus winding the shift cable thereon.

Figure 4D:
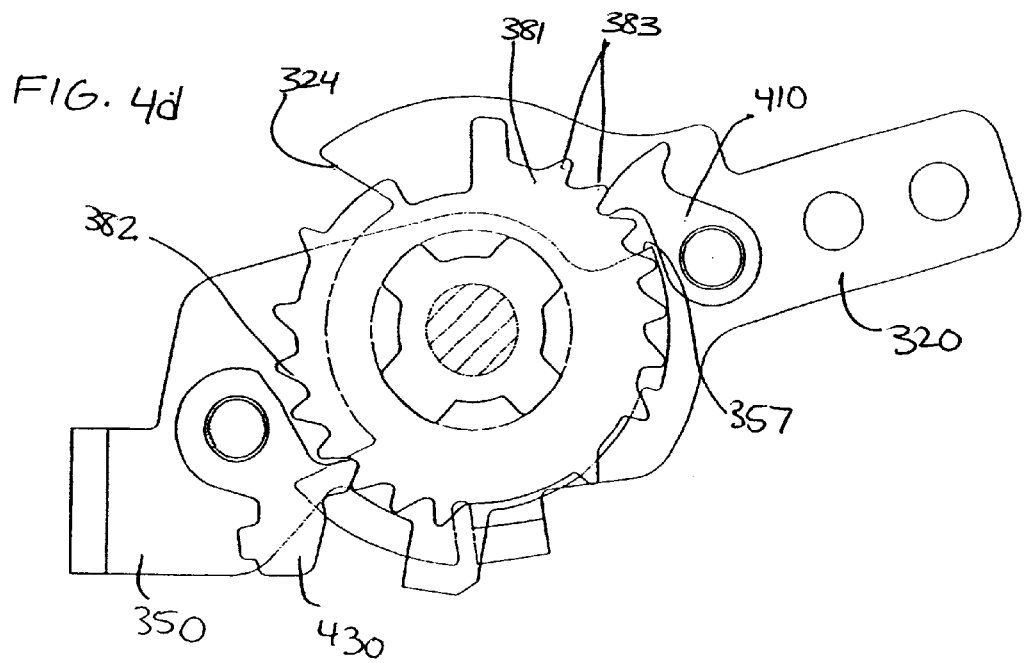
Figure 4E:
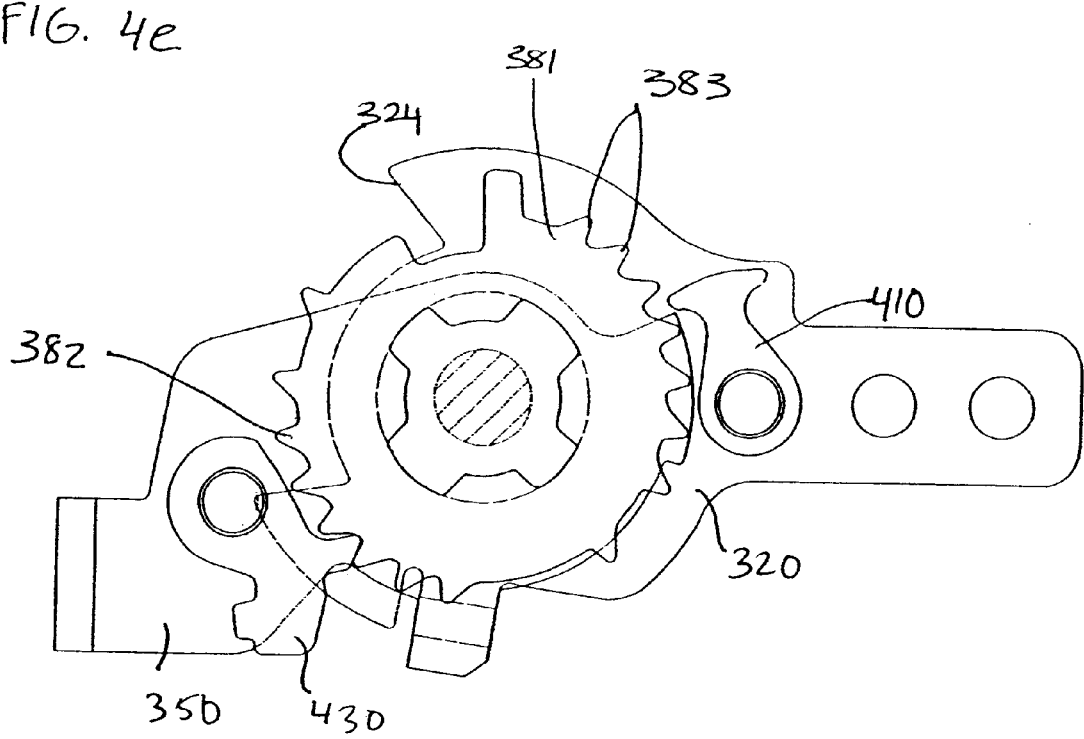

As best shown in FIG. 4d, because the positioning pawl 430 is biased toward the positioning latch 382, the positioning pawl 430 engages a tooth of the positioning latch 382 adjacent the previously engaged tooth. In a preferred embodiment of the invention, the positioning pawl 430 produces an audible click when the positioning pawl 430 engages the positioning latch 382. Moreover, the bicycle rider can feel the snap of the positioning pawl 430 engaging the positioning latch 382. The audible click and the snapping motion alerts the rider that the positioning pawl 430 has advance by one tooth completing one step of a multi-step shift mechanism. Upon completion of the one step shift, the operating plate 320 returns to the neutral position, as shown in FIG. 4e.

In a preferred embodiment of the invention, the shift control mechanism 300 of the present invention is configured to enable the rider to shift more than one step at a time, and more preferably to shift up to three steps at a time. To perform a multi-step winding operation, the bicycle rider rotates the control lever 150 further in the winding direction W. The shift control mechanism 300 operates as describe above in that the winding pawl 410 engages the winding latch 381 driving the winding latch 381 in the winding direction W. The positioning pawl 430 disengages from the positioning latch 382 and engages the tooth adjacent the previously engaged tooth. However, in the multi-step winding operation, the bicycle rider continues to rotate the control lever 150 causing the first latch plate 380 to rotate further, and positioning pawl 430 to continue to engage neighboring teeth 384 of the positioning latch 382 until the first latch plate 380 ceases to rotate. In a preferred embodiment of the invention, a winding stopper 324 is provided on the operating plate 320 for engaging with the mounting member 133 (shown in FIG. 2) of the brake lever base 130 to limit the angle of rotation of the operating plate 320 in the winding direction W.

To operate the shift control mechanism 300 in the release direction R, the control lever 150 is rotated in the release direction. As previously discussed, in a preferred embodiment of the invention, as viewed from the rider's perspective, the release direction R is defined as the direction of movement of the control lever 150 from the neutral position upward. In a more preferred embodiment of the invention, the release direction R is perpendicular to the braking direction B. To operate the control lever 150 in a release direction, the rider preferably pulls the control lever 150 upward using the rider's index finger, middle finger or both the index and middle fingers. Alternatively, the rider's fingers can be placed under the control lever 150 and the control lever can be moved upward using the nail side of the fingers. One of the advantages of the present invention is that the control lever 150 can be operated without requiring the removal of the rider's thumb from the handlebar 200. Accordingly, the rider can maintain a control of the handlebar 200 while shifting gears.

Figure 5A:
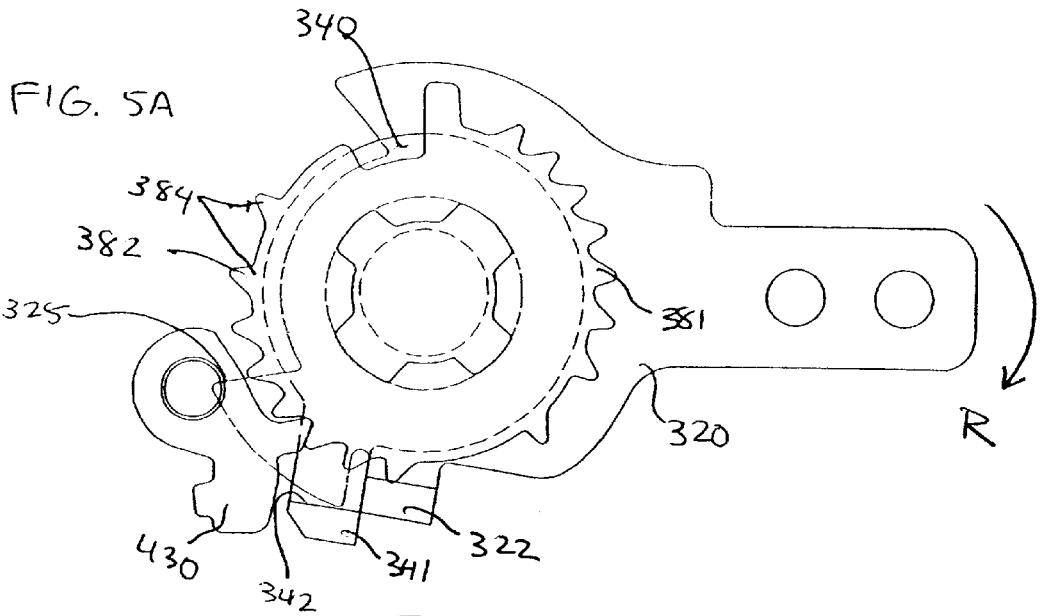
FIGS. 5a–5c are top cross-sectional views of the shift control mechanism of the present invention depicting the motion of the positioning pawl when the control device is operated in a release direction.
Figure 5B:
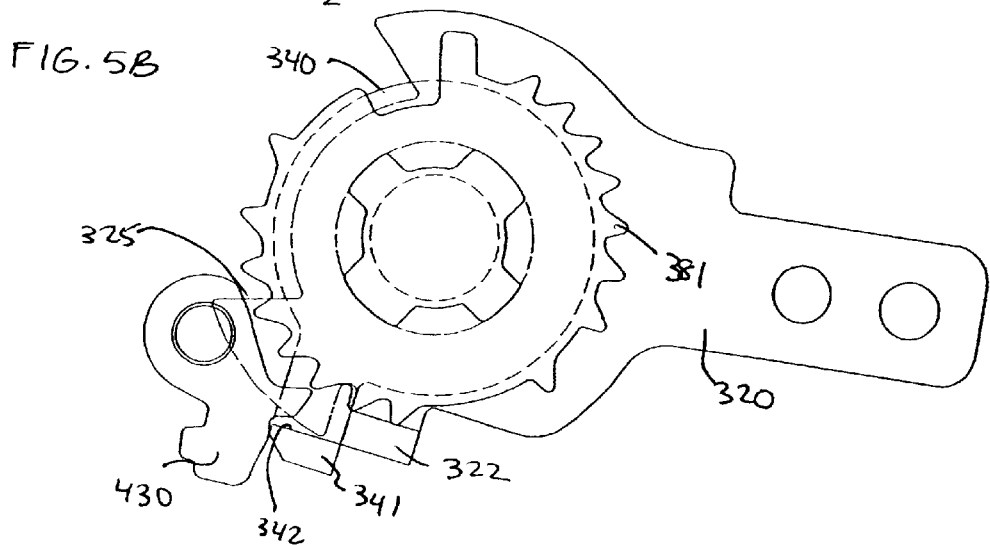
Figure 5C:
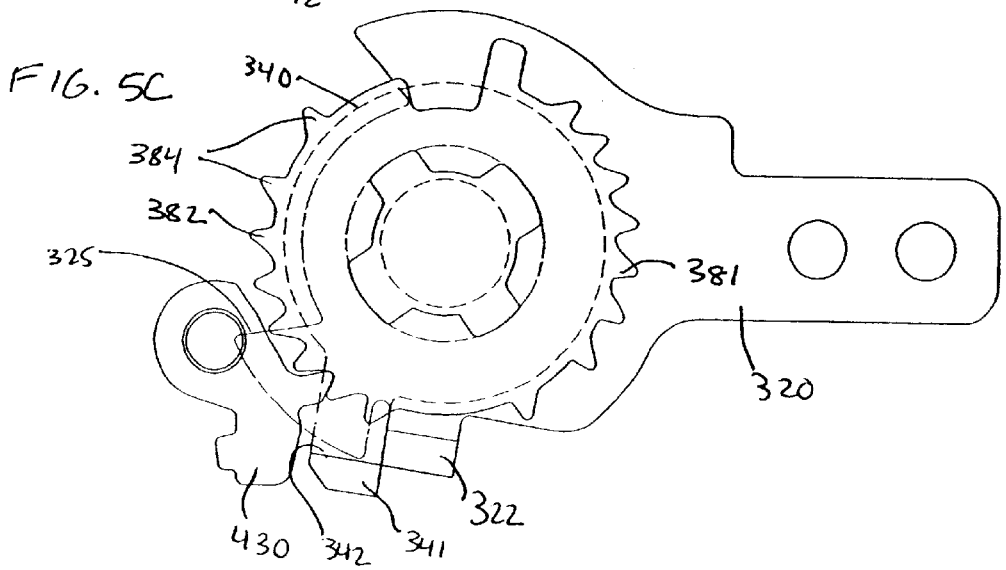
Figure 6A:
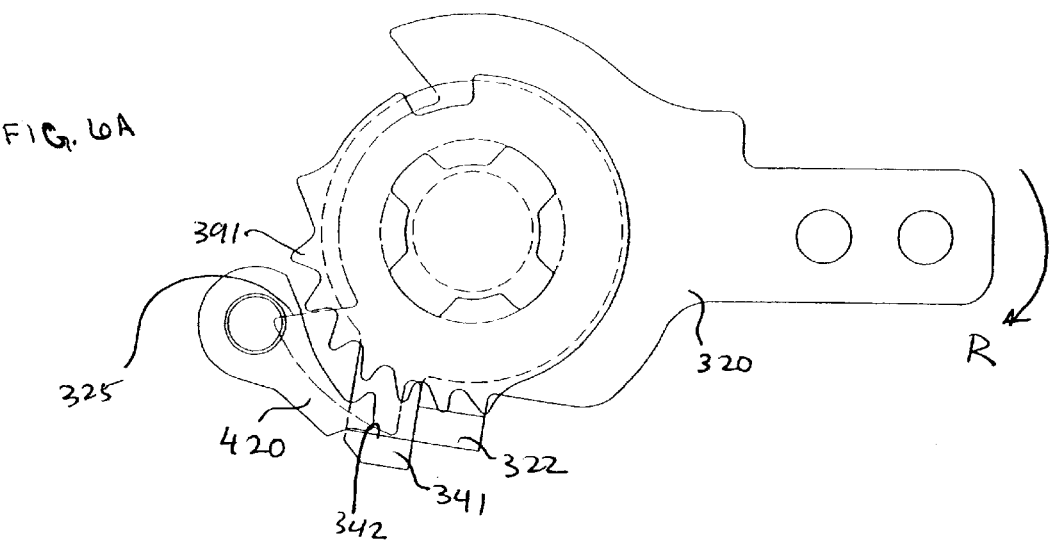
FIGS. 6a–6c are top cross-sectional views of the shift control mechanism of the present invention depicting the motion of the limiting pawl when the control device is operated in a release direction.
Figure 6B:
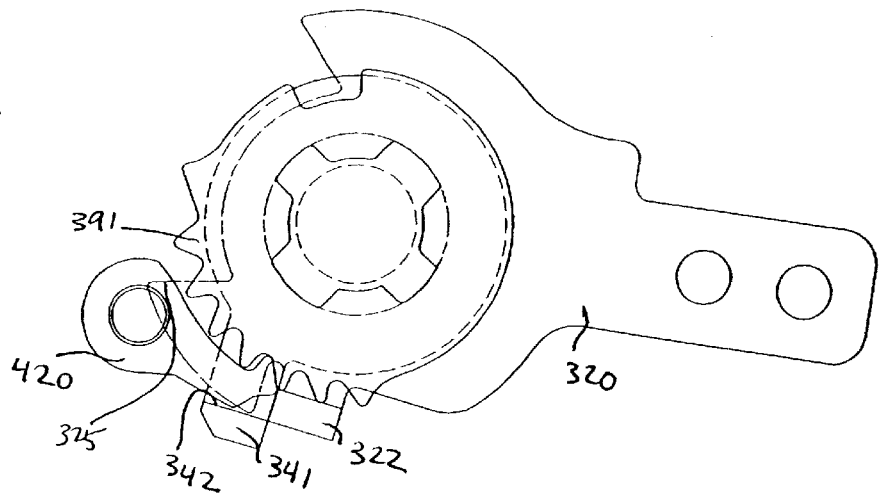
Figure 6C:
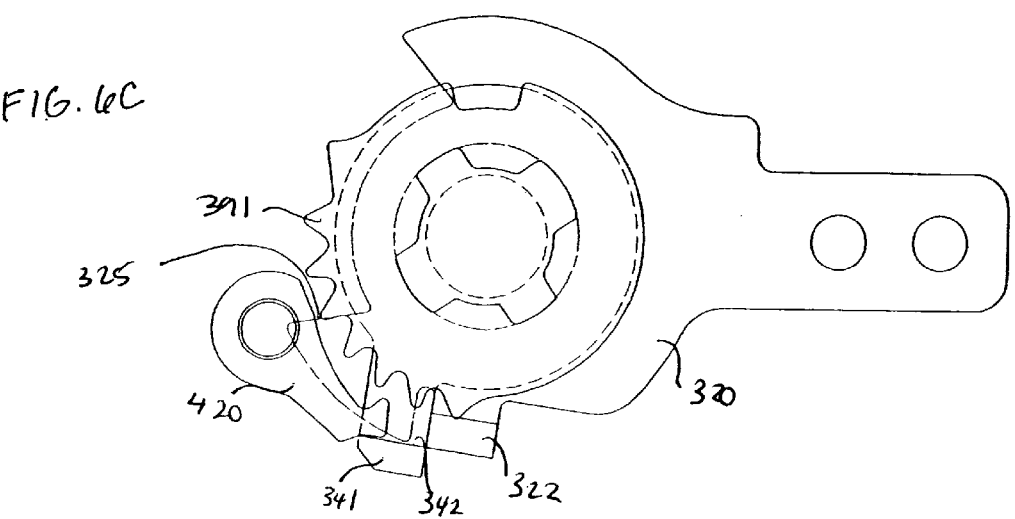

The releasing operation of a preferred embodiment of the shift control mechanism 300 is now described. For ease of understanding, the movement of the positioning pawl 430 and the interrupting pawl 420 are shown separately. FIGS. 5a through 5c depict the movement of the positioning pawl 430 during the releasing operation. FIGS. 6a through 6c depict the movement of the interrupting pawl 420 during the releasing operation. FIG. 5a corresponds temporally to FIG. 6a, FIG. 5b corresponds temporally to FIG. 6b, and FIG. 5c corresponds temporally to FIG. 6c. Accordingly, the motion depicted in FIG. 5b, for example, occurs simultaneously with the motion depicted in FIG. 6b.

FIGS. 5a and 6a illustrate the shift control mechanism 300 in a neutral position. To release the shift cable, the control lever 150 is operated in the release direction R, causing the operating plate 320 to rotate in the release direction. In reference to FIGS. 5b and 6b, as the operating plate 320 is rotated in the release direction, the operating abutment 322 pushes the releasing abutment 341, causing the releasing plate 340 to rotate. As shown in FIG. 5b, the release abutment 341 contacts the positioning pawl 430 and disengages the positioning pawl 430 from the positioning latch 382. Because the first latch plate 380 is biased in a release direction, the disengagement of the positioning pawl 430 allows the first latch plate 380, and hence the winding member 370, to rotate freely in the release direction R. To limit the rotation of the winding member, as shown in FIG. 6a, the releasing abutment 341 includes an inside edge 342 that is configured to contact the interrupting pawl 420 and push the interrupting pawl 420 into engagement with the interrupting latch 391. The engagement of the interrupting pawl 420 with the interrupting latch 391 limits the rotation of the winding member 370 when the positioning pawl 430 is disengaged from the positioning latch 382.

In a preferred embodiment of the invention, the rider can feel and hear the click produced by the engagement of the interrupting pawl 420 with the interrupting latch 391. Upon hearing or feeling the click, the rider can release the control lever 150 returning the operating plate 320 to its neutral position. In reference to FIG. 5c, as the operating plate 320 is returned to its neutral position, the positioning pawl 430 engages a tooth on the positioning latch adjacent the previously engaged tooth. In reference to FIG. 6b, as the operating plate is returned to its neutral position, the inside edge 342 of the releasing abutment 341 disengages from the interrupting pawl 420 causing the interrupting pawl to disengage from the interrupting latch 391. The cable releasing operation for a one step shift is completed and the operating plate 320 returns to its neutral position.

The angle of rotation of the operating plate 320 is preferably limited in the releasing direction by the contact of release stopper 325 with the mounting member 133 of the brake lever base 130 (shown in FIG. 2). In a preferred embodiment of the invention, the release stopper 325 limits the rotation of the winding member 370 in the release direction to one step.

The drawings depict a shift control mechanism for a nine step shift operation. However, the present invention is not limited to a nine step shift operation and can be configured to vary the number of steps available.

Figure 7A:
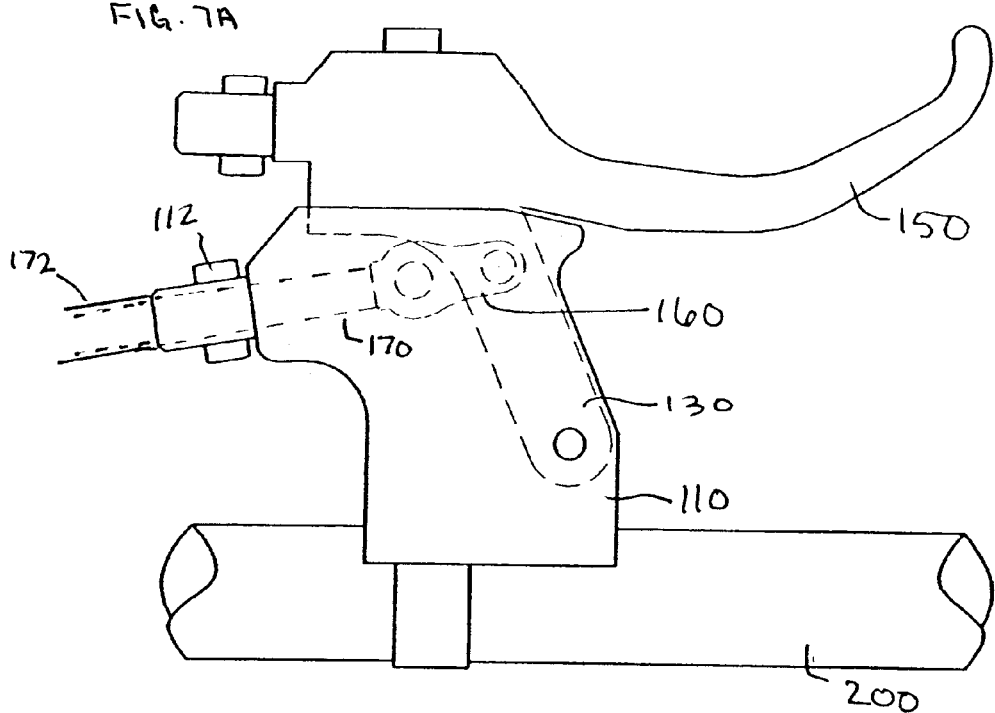
FIGS 7a–7b are side views of the brake mechanism of the present invention.
Figure 7B:
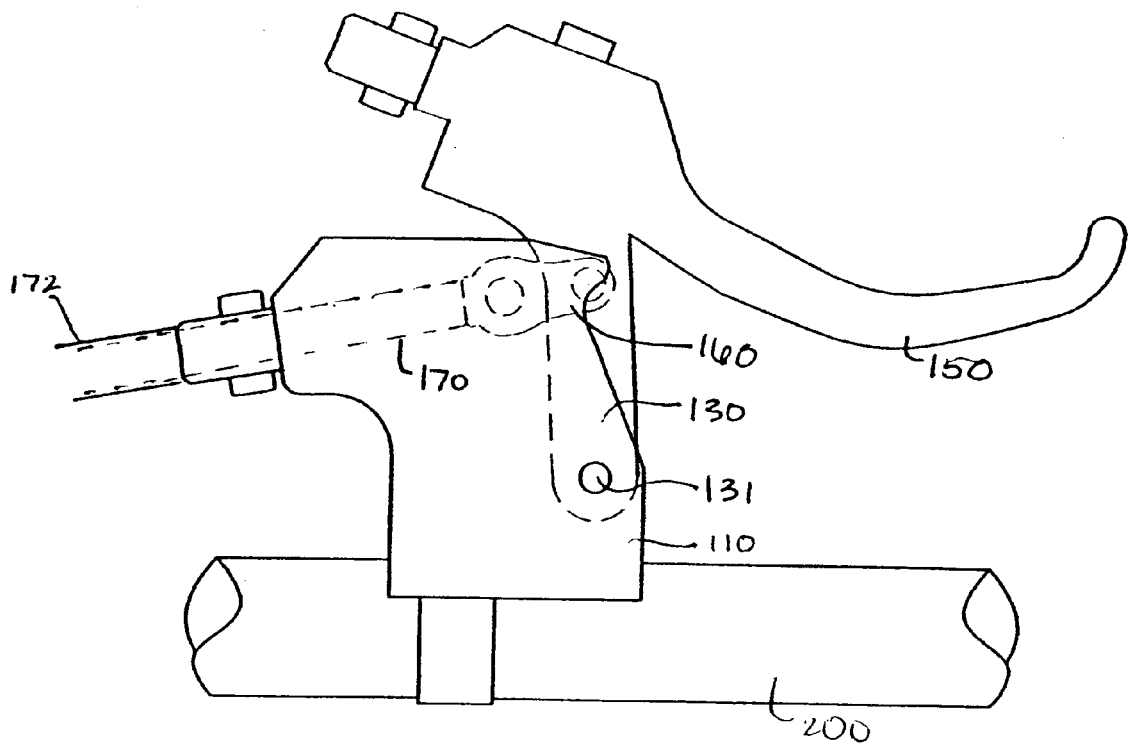

The operation of the brake mechanism of the present invention is described with reference to FIGS. 7a and 7b. To simplify the illustration, the shift control mechanism 300 of the present invention is not shown in FIGS. 7a and 7b. In a preferred embodiment, the brake cable 170 is attached to the cable hook 160 and the outer casing 172 of the brake cable 170 is attached to the brake cable adjuster 112. By pulling the control lever 150 toward the handlebar 200, the brake base lever 130 pivots about the pivot pin 131, and the brake cable 170 is extracted from the outer casing 172. The movement of the brake cable 170 actuates the braking mechanism in a manner known by those skilled in the art. If desired, the braking operation can be performed simultaneously with the shifting operation.

Figure 8:
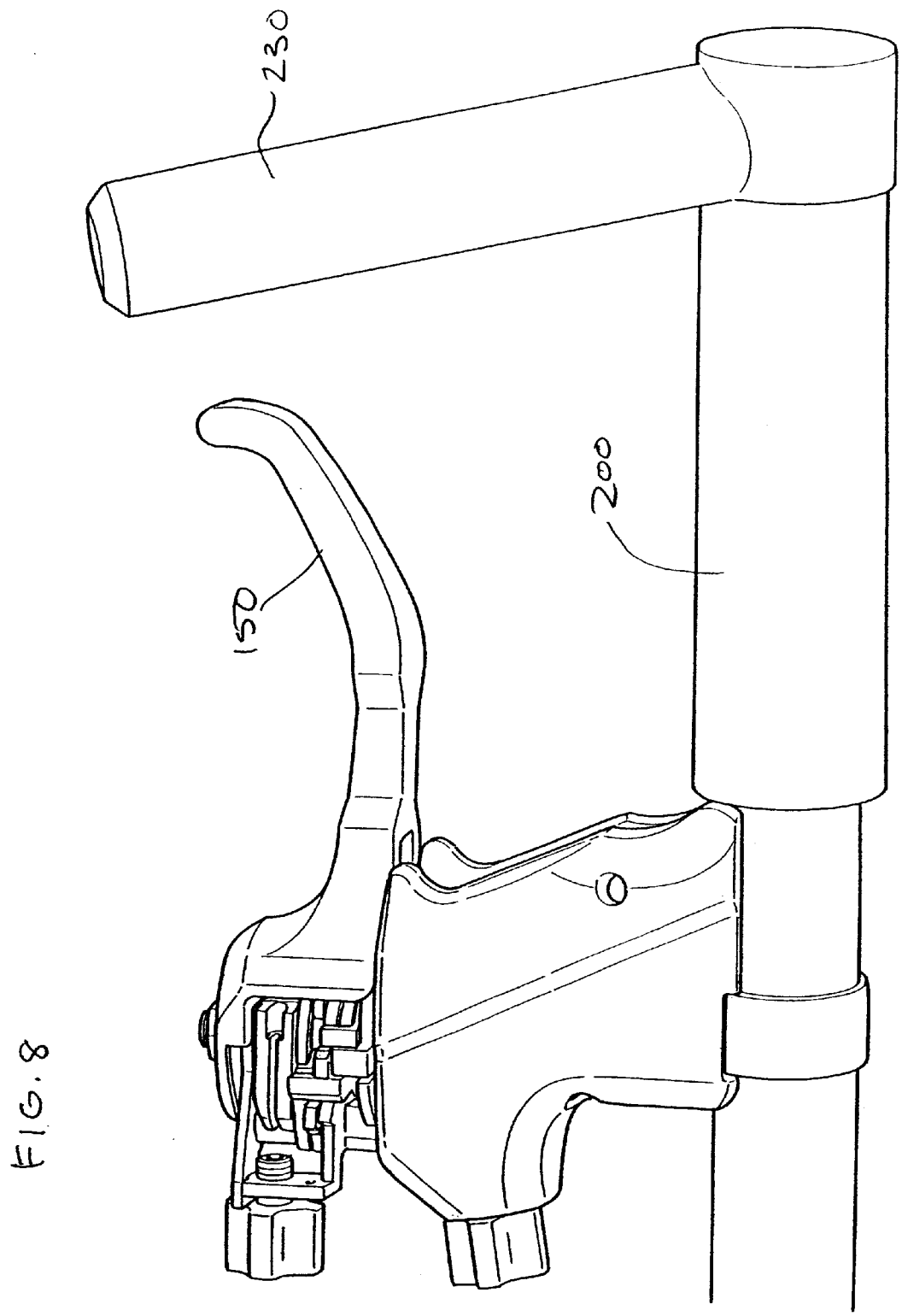
FIG. 8 is a perspective view of the control device of the present invention attached to a handlebar equipped with handlebar extensions.

The bicycle control device 100 of the present invention is shown, in FIG. 8, on a handlebar 200 having handlebar extensions 230. In a preferred embodiment of the invention, handlebar extensions 230 extend substantially perpendicularly upward from the handlebar 200 and provide the bicycle rider with an alternative position to grip and maneuver the handlebar 200. As shown in FIG. 8, the control lever 150 is located proximal to the handlebar extensions 230 and is dimensioned such that a rider can operate the control lever 150 in the winding and releasing directions W, R while maintaining a grip on the handlebar extensions 230.

Figure 9:
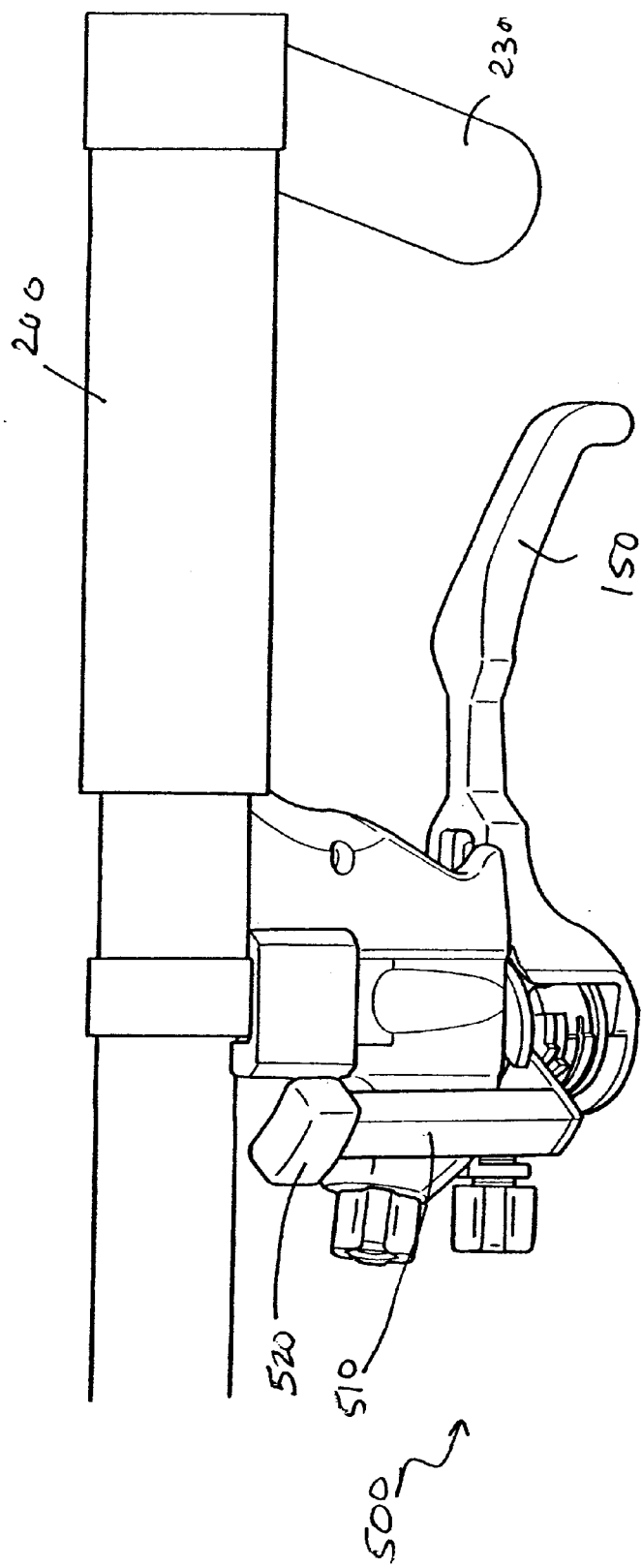
FIG. 9 is a back view of another embodiment of the control device of the present invention having a supplemental release lever.

Another embodiment of the shift control device 500 is shown in FIG. 9. Shift control device 500 includes a release lever 510 extending directly from the releasing plate 340. The release lever 510 includes a control portion 520 to facilitate the activation of the release lever 510 by a rider's thumb. In a preferred embodiment of the invention, the release lever extends below the bracket 110 and is positioned such that the control portion 520 of the release lever 510 is easily accessible to the rider's thumb when the rider is gripping the handlebar 200. By providing the release lever 510, the rider is given an additional control option. The rider can utilize the release lever 510 to perform a release operation even if the rider's fingers are not on the control lever 150.

FIG. 11 discloses another preferred embodiment of the release lever 650 having a knob shape. The release lever 650 is preferably fastened to the releasing plate 340 using fasteners 651. The release lever 650 is preferably separable form the releasing plate and can be replaced without replacing the entire shift control mechanism. Depending on the shape of the release lever 650, an extension 652 may be provided on the releasing plate 340 to position the release lever 650 spaced apart from the shift control mechanism, and thus allow room for the release lever 650 to operate smoothly.

As shown in FIGS. 12 and 13, a preferred embodiment of the control lever 150 includes a plurality of risings to facilitate the operation of the control lever. The control lever 150 preferably includes a proximal end 660 attached to the shift control mechanism 300 and a distal end 662. To operate the control lever 150 in a winding direction, the user preferably contacts the winding surface 664 and moves the control lever in the winding direction W. Similarly, to operate the control lever 150 in a release direction, the user preferably contacts the releasing surface 666 and moves the control lever in the releasing direction R.

At the distal end 662 of the control lever 150, the winding surface 664 preferably defines a first projection or rising 668. The first rising 668 is configured to facilitate operation of the control lever by reducing the chance of the rider's fingers from slipping off of the control lever. Similarly, the releasing surface 666 defines a second projection or rising 670 at the distal end of the control lever to prevent the rider's fingers from slipping off of the control lever when the rider is moving the control lever in the releasing direction R.

As shown in FIG. 13, the control lever 150 includes a braking surface 672. To operate the braking mechanism, the user preferably contacts the braking surface 672 and moves the control level in the braking direction B. At the distal end 662 of the control lever 150, the braking surface 672 preferably defines a third projection or rising 674. The third rising 674 is configured to facilitate operation of the control lever by reducing the chance of the rider's fingers from slipping off of the control lever when the rider is performing a braking operation.

The description of the shift control device and the corresponding drawings is directed to a shift control device to be installed on the right hand side of a bicycle handlebar when viewed from the rider's perspective. The shift control device installed on the left hand side of the bicycle handlebar is substantially the mirror image of the shift control device of the right hand side.

The embodiments described above are exemplary embodiments of a bicycle control device. Those skilled in the art may now make numerous uses of, and departures from, the above-described embodiments without departing from the inventive concepts disclosed herein. Accordingly, the present invention is to be defined solely by the scope of the following claims.

What is claimed is:

1. A bicycle control device, comprising:
    a brake control mechanism;
    a shift control mechanism having a pulling direction and a release direction;
    a control lever operatively connected to the brake control mechanism and the shift control mechanism;
    wherein the control lever is operable in a brake operating plane to operate the brake control mechanism; and
    wherein the control lever is operable in a shifting plane to operate the shift control mechanism in the pulling direction and in the release direction.

2. The bicycle control device of claim 1 wherein the pulling direction is the direction of movement of the control lever downward, and the release direction is the direction of movement of the control lever upward.

3. The bicycle control device of claim 1 wherein the brake operating plane is substantially perpendicular to the shifting plane.

4. The bicycle control device of claim 1 wherein, in the shifting plane, the control lever is pivotable between an upshift position, a neutral position and a downshift position, wherein the upshift position is on a first side of the neutral position and the downshift position is on a second side of the neutral position opposite the first side.

5. The bicycle control device of claim 1 wherein the brake control mechanism comprises:
   a bracket;
   a brake lever base pivotably connected to the bracket;
   a cable hook connected to the brake lever base, the cable hook configured to receive a brake cable; and
   wherein the operation of the control lever in the brake operating plane pivots the brake lever base on the bracket and actuates the cable hook.

6. The bicycle control device of claim 1 wherein the shift control mechanism comprises:
   a support shaft;
   a cable pulling member rotatable in the pulling direction and in the release direction about the support shaft, the cable pulling member configured to receive a gear-shifting cable and pull the cable when the cable pulling member is rotated in the pulling direction and release the gear-shifting cable when the cable pulling member is rotated in the release direction;
   a winding mechanism operatively connected to the cable pulling member; and
   a release and hold mechanism operatively connected to the cable pulling member.

7. The bicycle control device of claim 6 wherein the winding mechanism comprises a winding latch and a winding pawl configured to cooperate with the winding latch.

8. The shift control device of claim 6 wherein the gear-shifting cable is wound on the cable pulling member when the cable pulling member is rotated in the pulling direction.

9. The bicycle control device of claim 6 wherein the release and hold mechanism comprises:
   a first latching plate having a first latching segment formed at an outer circumferential edge of the first latching plate;
   a second latching plate having a second latching segment formed at an outer circumferential edge of the second latching plate;
   a positioning pawl configured to engage with the first latching segment of the first latching plate;
   an interrupting pawl configured to engage with the second latching segment of the second latching plate;
   the interrupting pawl and positioning pawl alternately engaging the corresponding second latching segment and first latching segment when the pulling member operates in a release direction.

10. The bicycle control device of claim 9 wherein the pulling member is biased in the release direction.

11. The bicycle control device of claim 10 wherein the positioning pawl is biased toward the first latching segment formed on the first latching plate.

12. The bicycle control device of claim 11 wherein the brake control mechanism comprises:
   a bracket;
   a brake lever base pivotably connected to the bracket;
   a cable hook connected to the brake lever base, the cable hook configured to receive a brake cable;
   wherein the operation of the control lever in the brake operating plane pivots the brake lever base on the bracket and actuates the cable hook; and
   wherein the support shaft is fixedly attached to the brake lever base.

13. The bicycle control device of claim 11 wherein the brake control mechanism comprises:
   a fluid reservoir;
   an outlet spaced apart from the fluid reservoir; and
   a piston operatively connected to the control lever, wherein the movement of the piston controls fluid communication between the reservoir and the outlet.

14. The bicycle control device of claim 1 further comprising a hydraulic brake bracket operatively connected to the control lever.

15. The bicycle control device of claim 14 wherein the brake control mechanism comprises:
   a fluid reservoir;
   an outlet spaced apart from the fluid reservoir; and
   a piston operatively connected to the control lever, wherein the movement of the piston controls fluid communication between the reservoir and the outlet.

16. A bicycle control device, comprising:
   a brake control mechanism;
   a shift control mechanism having a pulling direction and a release direction;
   a control lever operatively connected to the brake control mechanism and the shift control mechanism; and
   wherein the control lever is operable in a first direction to operate the brake control mechanism, a second direction to operate the shift control mechanism in the pulling direction and a third direction to operate the shift control mechanism in the release direction.

17. The bicycle control device of claim 16 wherein the second and third directions lie along the same line.

18. The bicycle control device of claim 17 wherein the first direction is substantially perpendicular to the second and third directions.

19. A bicycle control device attachable to the bicycle handlebar, the bicycle control device comprising:
   a brake control mechanism;
   a shift control mechanism having a pulling direction and a release direction;
   a control lever operatively connected to the brake control mechanism and the shift control mechanism;
   wherein the control lever is pivotable about a first axis to operate the brake control mechanism; and
   wherein the control lever is pivotable about a second axis to operate the shift control mechanism in the pulling direction and in the release direction.

20. The bicycle control device of claim 19 wherein the first axis is substantially perpendicular to the second axis.

21. The bicycle control device of claim 19 wherein the handlebar comprises a flat-bar type handlebar.

22. A bicycle control device, comprising:
   a brake control mechanism having a bracket, a brake lever base pivotably connected to the bracket, and a cable hook connected to the brake lever base, the cable hook configured to receive a brake cable;
   a shift control mechanism having:
      a support shaft fixedly connected to the brake lever base of the brake control mechanism;
      a pulling member rotatable in a pulling direction and in a release direction about the support shaft, the pulling member biased in the release direction and configured to receive a gear-shifting cable, wherein the gear-shifting cable is pulled when the pulling member is rotated in the pulling direction and released when the pulling member is rotated in the release direction;

a winding mechanism comprising a winding latch and a winding pawl biased toward the winding latch and configured to cooperate with the winding latch to rotate the pulling member in a pulling direction; and a release and hold mechanism comprising a first latching plate having a first latching segment, a second latching plate having a second latching segment, a positioning pawl biased toward the first latching segment and configured to engage with the first latching segment, an interrupting pawl configured to engage with the second latching segment, wherein the interrupting pawl and positioning pawl alternately engage the corresponding second latching segment and first latching segment when the pulling member operates in the release direction; and a control lever operatively connected to the brake control mechanism and the shift control mechanism wherein the control lever is operable in a first direction to operate the brake control mechanism, a second direction to operate the shift control mechanism in the pulling direction and a third direction to operate the shift control mechanism in the release direction.

23. The bicycle control device of claim 22, further comprising:

a fixed plate fixedly connected to a mounting member of the brake lever base;

a releasing plate biased toward the fixed plate on a first side of the fixed plate;

a winding plate biased toward the fixed plate on a second side of the fixed plate, opposite the first side;

an operating plate operatively connected to the releasing plate and the winding plate wherein during a release operation, the operating plate operates the release plate in the release direction and wherein during a winding operation, the operating plate operates the winding plate in the pulling direction.

24. The bicycle control device of claim 23 further comprising a supplemental release lever extending from the releasing plate.

25. The bicycle control device of claim 23 further comprising a detent assembly engageable with a slot in the operating plate, when the operating plate is in a neutral position.

26. The bicycle control device of claim 25 wherein the detent assembly further comprises a spring and a ball, wherein the spring biases the ball toward the slot in the operating plate.

27. The bicycle control device of claim 26 wherein the ball and spring are housed in a mounting member of the brake lever base.

28. A method of operating a shift control mechanism and a brake control mechanism, comprising the steps of:

providing a shift control mechanism operative in a pulling direction and a release direction, a brake control mechanism and a control lever;

actuating the control lever in a first direction to operate the brake control mechanism;

actuating the control lever in a second direction to operate the shift control mechanism in the pulling direction; and actuating the control lever in a third direction to operate the shift control mechanism in the release direction.

29. The operating method of claim 28 wherein the second and third directions lie along the same line.

30. The operating method of claim 29 wherein the first direction is perpendicular to the second and third directions.

31. A bicycle control device, comprising:

a brake control mechanism;

a shift control mechanism having an operating plate, the operating plate operable in a pulling direction and a release direction;

a control lever operatively connected to the brake control mechanism and the shift control mechanism;

wherein the control lever is operable in a brake operating plane to operate the brake control mechanism;

wherein the control lever is operable in a shifting plane to operate the shift control mechanism in the pulling direction and in the release direction; and wherein in a neutral position, the operating plate is held stationary using a detent assembly.

32. The bicycle control device of claim 31 wherein the control lever is connected to the operating plate via fasteners and is removable therefrom.

33. The bicycle control device of claim 32 wherein the control lever comprises a narrow portion.

34. A bicycle control device, comprising:

a brake control mechanism;

a shift control mechanism having a pulling direction and a release direction;

a bearing assembly operatively connected to the shift control mechanism to minimize friction and smoothly operate the shift control mechanism in the pulling and release directions;

a control lever operatively connected to the brake control mechanism and the shift control mechanism;

wherein the control lever is operable in a brake operating plane to operate the brake control mechanism; and wherein the control lever is operable in a shifting plane to operate the shift control mechanism in the pulling direction and in the release direction.

* * * * *

UNITED STATES PATENT AND TRADEMARK OFFICE
CERTIFICATE OF CORRECTION

PATENT NO. : 6,647,823 B2
DATED : November 18, 2003
INVENTOR(S) : Akira Tsumiyama and Nobukatsu Hara It is certified that error appears in the above-identified patent and that said Letters Patent is hereby corrected as shown below:

Column 14,
Line 52, insert the following claim:
35. The shift control device of claim 22, wherein the gear-shifting cable is wound on the cable pulling member when the cable pulling member is rotated in the pulling direction.

Signed and Sealed this

Twenty-seventh Day of April, 2004

JON W. DUDAS
*Acting Director of the United States Patent and Trademark Office*